US010496046B2

(12) United States Patent
Periasamy et al.

(10) Patent No.: US 10,496,046 B2
(45) Date of Patent: Dec. 3, 2019

(54) SYSTEMS AND METHODS FOR OPTIMIZING CONTROL SYSTEMS FOR A PROCESS ENVIRONMENT

(71) Applicant: Yokogawa Engineering Asia Pte. Ltd., Singapore (SG)

(72) Inventors: Karthik Raja Periasamy, Singapore (SG); Sankar Selvaraj, Singapore (SG); Gokula Krishnan Sivaprakasam, Singapore (SG)

(73) Assignee: Yokogawa Engineering Asia Pte. Ltd., Singapore (SG)

( * ) Notice: Subject to any disclaimer, the term of this patent is extended or adjusted under 35 U.S.C. 154(b) by 559 days.

(21) Appl. No.: 15/186,848

(22) Filed: Jun. 20, 2016

(65) Prior Publication Data
US 2017/0017211 A1    Jan. 19, 2017

(30) Foreign Application Priority Data
Jul. 14, 2015    (SG) .......................... 10201505489Q

(51) Int. Cl.
G05B 13/02    (2006.01)
G06F 9/54    (2006.01)
G05B 15/02    (2006.01)

(52) U.S. Cl.
CPC ......... *G05B 13/0205* (2013.01); *G05B 15/02* (2013.01); *G06F 9/542* (2013.01)

(58) Field of Classification Search
CPC ... G05B 13/0205; G05B 15/02; G06F 13/366; G06F 13/4068; G06F 9/5011;
(Continued)

(56) References Cited

U.S. PATENT DOCUMENTS 6,195,591 B1    2/2001  Nixon et al.
7,376,655 B2    5/2008  Heidemann
(Continued)

FOREIGN PATENT DOCUMENTS

| CN | 104579747 | 4/2015 |
| IN | 1276/KOL/2007 | 5/2008 |
| JP | 2014-092956 | 11/2015 |

OTHER PUBLICATIONS

Singaporean Search Report and Written Opinion dated Sep. 20, 2016 in Patent Application No. 10201602357V filed Mar. 24, 2016.
(Continued)

*Primary Examiner* — Thomas C Lee
*Assistant Examiner* — Zhipeng Wang
(74) *Attorney, Agent, or Firm* — Oblon, McClelland, Maier & Neustadt, L.L.P.

(57) ABSTRACT

The invention enables methods, systems and computer program products for control system optimization. The invention comprises retrieving from an engineering information repository, control system engineering information corresponding to an implemented control system. Based on the retrieved control system engineering information, a plurality of function blocks and function block interconnections corresponding to the implemented control system are identified. At least one group of function blocks is identified from among the plurality of function blocks corresponding to the implemented control system. Identification of the group of function blocks is based on identification of one or more attributes shared by each function block within the identified group of function blocks. The invention thereafter generates a control system topology based on the identified function blocks, identified function block interconnections, and identified group of function blocks.

21 Claims, 19 Drawing Sheets

(58) Field of Classification Search
CPC . G06F 9/542; H04L 41/0853; H04L 41/0893; H04L 41/142
See application file for complete search history.

(56) References Cited

U.S. PATENT DOCUMENTS

| | | | |
|---|---|---|---|
| 8,595,652 | B2 | 11/2013 | Retlich |
| 2003/0009552 | A1* | 1/2003 | Benfield ............ H04L 41/0213 709/224 |
| 2008/0077512 | A1 | 3/2008 | Grewal |
| 2008/0082193 | A1 | 4/2008 | Enver et al. |
| 2011/0040390 | A1 | 2/2011 | Blevins et al. |
| 2011/0230980 | A1* | 9/2011 | Hammack ............ G05B 19/409 700/17 |
| 2012/0089239 | A1* | 4/2012 | Sentgeorge ........ G05B 19/4185 700/2 |
| 2016/0112270 | A1* | 4/2016 | Danait ................. H04L 41/142 709/220 |
| 2017/0286169 | A1* | 10/2017 | Ravindran ............ G06F 13/366 |

OTHER PUBLICATIONS

D.P. Atherton et al., Holistic Perception in Measurement and Control: Applying Keys Adapted from Classical Taxanomy, Trends in Control and Measurement Education: Selected Papers from the IFAC Symposium, Swansea, UK, Jul. 11-13, 1988, Jun. 28, 2014, Figure 2, p. 87.

* cited by examiner

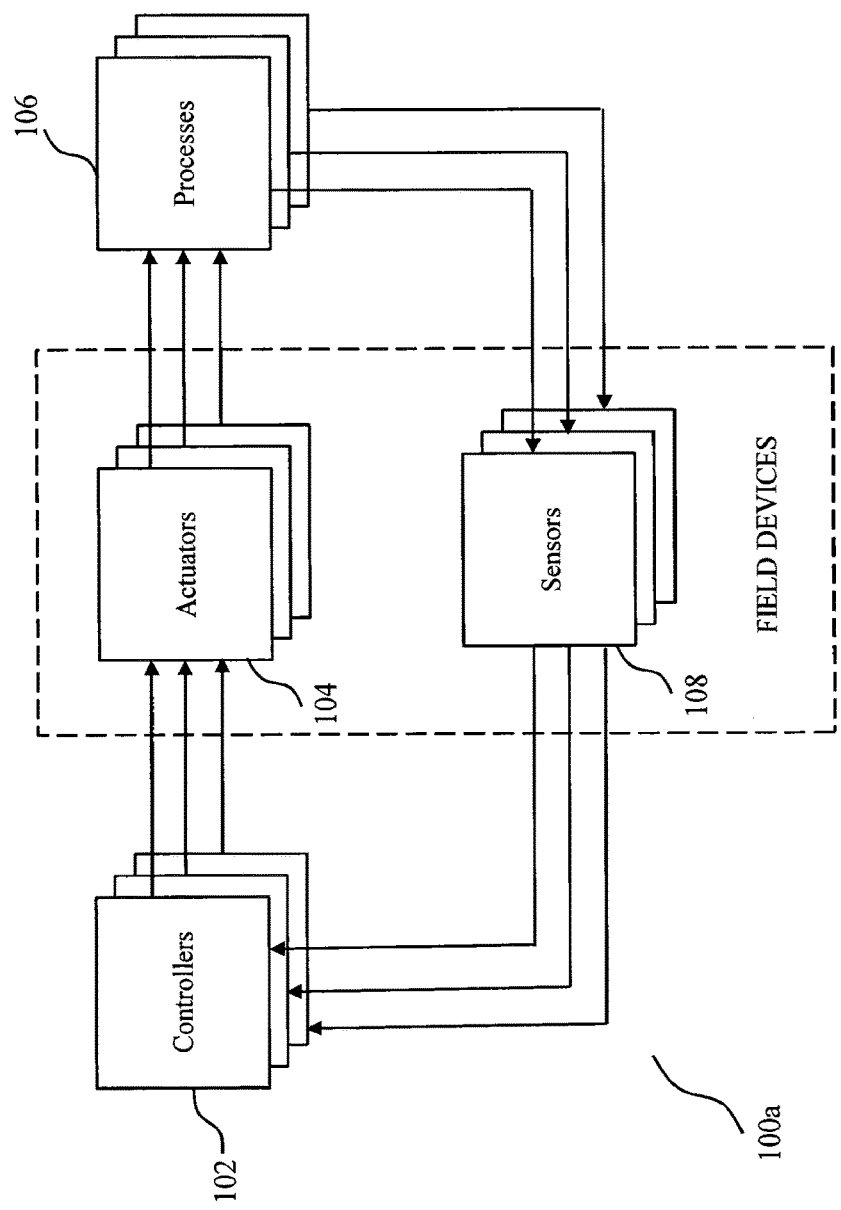

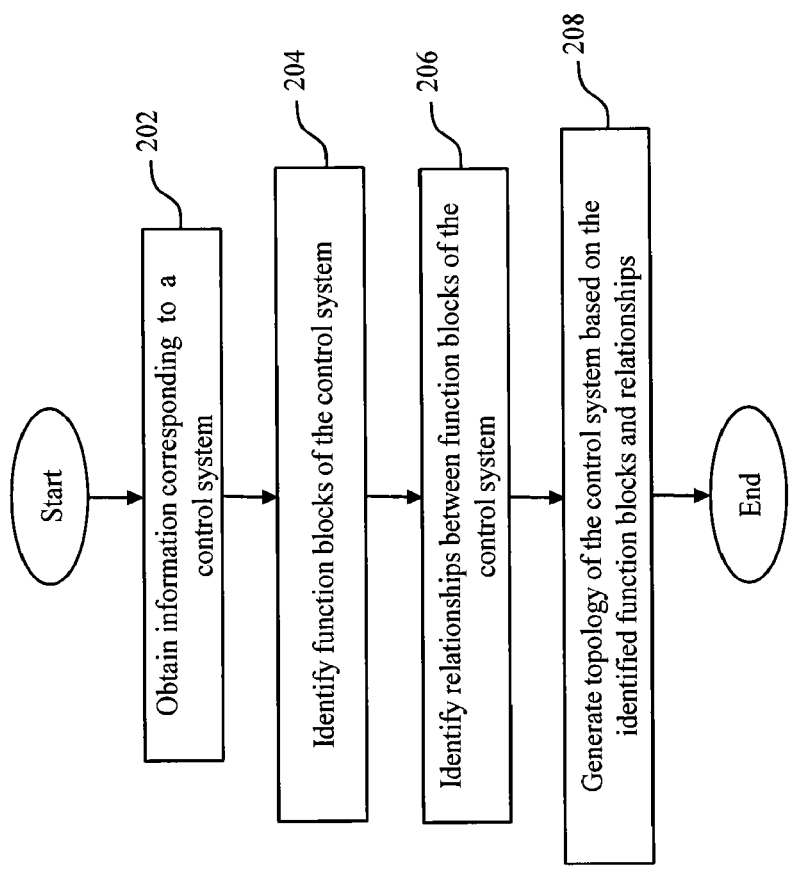

| FROM NODE | TO NODE | |
|---|---|---|
| 1 | 302 | 304 |
| 2 | 302 | 306 |
| 3 | 302 | 308 |
| 4 | 304 | 310 |
| 5 | 304 | 312 |
| 6 | 306 | 314 |
| 7 | 308 | 314 |
| 8 | 310 | 316 |
| 9 | 312 | 314 |
| 10 | 314 | 316 |

FIGURE 3B

SYSTEMS AND METHODS FOR OPTIMIZING CONTROL SYSTEMS FOR A PROCESS ENVIRONMENT

FIELD OF THE INVENTION

The invention relates to the field of control systems including industrial or other process control systems. In particular the invention extracts and aggregates control system data for generating control system topologies.

BACKGROUND

Control system engineering refers to a domain of engineering that deals with architectures, mechanisms and algorithms for maintaining output of a specific system or process within a desired range. Automated control systems are used extensively in industry and for example can be achieved using programmable logic controllers (PLC(s)), or in the case of more complex systems using distributed control systems (DCS) or supervisory control and data acquisition systems (SCADA).

Automated control systems rely on one or more controllers communicatively coupled to one or more field devices. Field devices (e.g. sensors, valves, switches, receivers and transmitters) are located within the process environment corresponding to the control system (for example, but not limited to, an industrial plant or system) and may be configured to perform physical or process control functions to control one or more components, processes or variables under observation within the process environment. Process controllers may be located within the process environment and are configured to receive signals from field devices, make control decisions, generate control signals and communicate with field devices.

Existing control systems rely on data received from field devices within the process environment and on archival of such data. Data generated by controllers or field devices within a process environment are stored in a plurality of specifically designated databases (e.g. data historians or data silos). These plurality of databases are independent and heterogeneous, in that they may differ from one another with respect to platform, or computer system in which they reside, data model, storage, retrieval, language for implementation, interfaces and languages for querying and updating, schema, and data types. Among other reasons, the large number of heterogeneous field devices typically implemented within a control system results in data from the control system being stored in a wide variety of different data formats and at different frequencies.

Structuring databases and collecting and storing data in a heterogeneous or distributed manner presents obstacles to unified access and to interpretation of control system data. For example, root cause analysis of events within a process environment may require access to data retrieved from multiple databases. Differing data formats and collection frequencies implemented by various field devices, along with heterogeneous database file structures, database attributes and database interfaces prevents data from being accessed, analysed or interpreted in a comprehensive way, and interferes with consolidated audit, synchronization or monitoring activity within a control system.

These limitations have consequences for efficient monitoring and control of process environments—including in connection with real time system monitoring, problem detection, problem analysis, remedial action and/or predictive modelling. Overcoming such limitations requires time consuming preparatory work flows that must be performed to extract and rationalize data from multiple databases before executing a desired system related operation. Data that is obtained as a result of the preparatory work flows may suffer from inaccuracies as a consequence of misinterpretation, shifted time stamps, or problems in synchronization. Yet further, storage and retrieval of data from multiple databases may result in useful data being inadvertently discarded as irrelevant or unusable, and in useful data patterns or relationships remaining obscured.

There is therefore a need for automated and intelligent extraction, consolidation and interpretation of heterogeneous control system data that is received from a variety of field devices or other data points within a process environment or that stored across multiple databases associated with the process environment. There is additionally a need for identifying relationships between multiple data points within a process environment—to enable accurate modelling of the process environment, and to optimize system operations, problem detection, problem analysis, remedial action and/or predictive modelling based on the identified relationships.

SUMMARY

The present invention enables methods, systems and computer program products for control system optimization.

A method embodiment of the invention comprises retrieving from an engineering information repository, control system engineering information corresponding to an implemented control system. Based on the retrieved control system engineering information, the method identifies a plurality of function blocks and function block interconnections corresponding to the implemented control system. At least one group of function blocks is identified from among the plurality of function blocks corresponding to the implemented control system. Identification of the group of function blocks is based on identification of one or more attributes shared by each function block within the identified group of function blocks. The method generates a control system topology based on the identified function blocks, identified function block interconnections, and identified group of function blocks.

The method may additionally include responding to detection of a first event within a process environment associated with the implemented control system by identifying a first function block and a second function block within the implemented control system. The identified first function block may be related to the detected first event and the identified second function block may be related to the identified first function block. One or more event notifications may be displayed at a user interface. The displayed one or more event notifications may include information corresponding to both the first function block and the second function block.

In a method embodiment, identification of the second function block may be based on at least one of function block interconnection information or function block group information retrieved from the control system topology. In an embodiment, the detected first event may be independent of the identified second function block. In another embodiment, display of one or more event notifications at a user interface may include displaying an event notification corresponding to a detected second event—which detected second event relates to the identified second function block.

The control system engineering information for identifying function blocks may include information retrieved from one or more of engineering documents, system specifications, control drawings, logic charts, sequence tables or interlock tables. Identification of one or more attributes shared by each function block within the identified group of function blocks may be based on classification identifiers assigned to each of the plurality of function blocks. The classification identifiers may conform to a hierarchically structured classification taxonomy.

In a particular embodiment of the invention, the one or more attributes shared by each function block within the identified group of function blocks may include any of physical location, physical media relied on for operation, equipment type or an upstream or downstream data flow, media flow or control flow relationship. In another embodiment, the one or more attributes shared by each function block within the identified group of function blocks may include location within a specific area or plant site, or being in network communication with other function blocks within the identified group of function blocks. In a further embodiment, the one or more attributes shared by each function block within the identified group of function blocks may comprise, inclusion of each function block within a single interface screen, display window or display wireframe corresponding to a user interface within the implemented control system.

Generating the control system topology may additionally be based on function block interconnections derived from component interconnections within the implemented control system. The component interconnections may be extracted from plant configuration information corresponding to the implemented control system.

A system embodiment of the invention may include one or more controllers, a plurality of field devices, a processor and a topology generator respectively configured to implement one or more of the steps described in the preceding paragraphs.

Specifically, the processor may be configured to (i) retrieve control system engineering information corresponding to an implemented control system, from an engineering information repository (ii) based on the retrieved control system engineering information, identify a plurality of function blocks and function block interconnections corresponding to the implemented control system and (iii) identify at least one group of function blocks from among the plurality of function blocks corresponding to the implemented control system, wherein identification of the group of function blocks is based on identification of one or more attributes shared by each function block within the identified group of function blocks.

The topology generator may be configured to generate a control system topology based on the identified function blocks, identified function block interconnections, and identified group of function blocks.

The system may additionally include a process monitor configured such that, responsive to detection of a first event within a process environment associated with the implemented control system, the process monitor (i) identifies a first function block within the implemented control system, wherein the identified first function block is related to the detected event (ii) identifies a second function block within the implemented control system, wherein the identified second function block is related to the identified first function block and (iii) displays one or more event notifications at a user interface, wherein the displayed one or more event notifications include information corresponding to both the first function block and the second function block. In an embodiment, identification of the second function block is based on at least one of function block interconnection information or function block group information retrieved from the control system topology.

The process monitor may be configured such that the detected event is independent of the identified second function block. The process monitor may in an embodiment be configured such that displaying one or more event notifications at the user interface includes displaying an event notification corresponding to a detected second event, wherein the detected second event relates to the identified second function block.

The processor may be configured such that control system engineering information relied on for the purpose of identifying function blocks, comprises information retrieved from one or more of engineering documents, system specifications, control drawings, logic charts, sequence tables or interlock tables.

The processor may in an embodiment be configured to identify one or more attributes shared by each function block within the identified group of function blocks based on classification identifiers assigned to each of the plurality of function blocks. The classification identifiers may conform to a hierarchically structured classification taxonomy. Shared attributes identified by the processor may include any of physical location, physical media relied on for operation, equipment type, an upstream or downstream data flow, media flow or control flow relationship, location within a specific area or plant site, being in network communication with other function blocks within the identified group of function blocks, or inclusion of each said function block within a single interface screen, display window or display wireframe corresponding to a user interface within the implemented control system.

The processor may be configured such that generating the control system topology is additionally based on function block interconnections derived from component interconnections within the implemented control system—wherein the component interconnections may be extracted from plant configuration information corresponding to the implemented control system.

The invention may additionally include a computer program product for control system optimization, comprising a computer usable medium having a computer readable program code embodied therein, the computer readable program code comprising instructions for implementing any of the method embodiments described above.

BRIEF DESCRIPTION OF ACCOMPANYING DRAWINGS

FIG. 1A illustrates a process control system.

FIG. 2 illustrates a method for generating control system topologies.

Figure 3A:
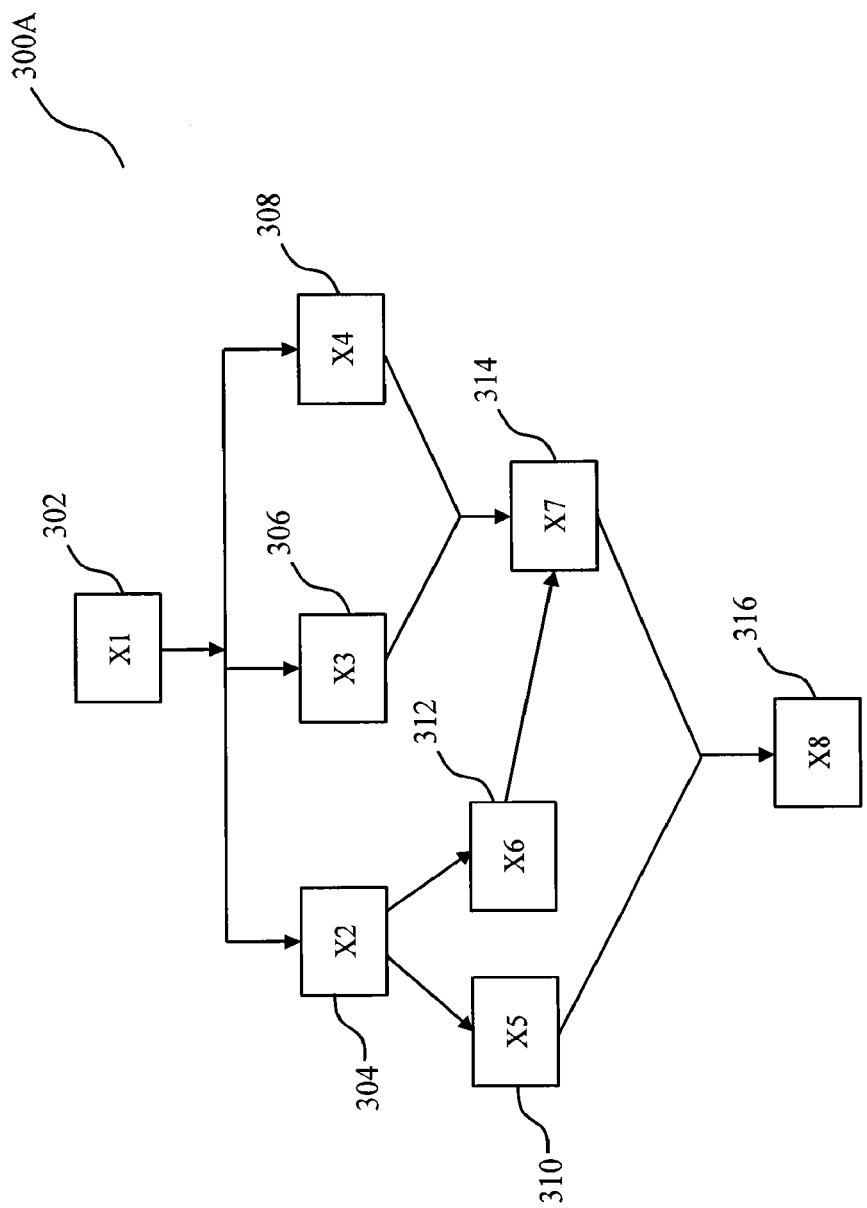

FIG. 3A provides an exemplary graphical representation of a control system topology.

FIG. 3B shows an exemplary data structure for storing the control system topology of FIG. 3A.

Figure 4:
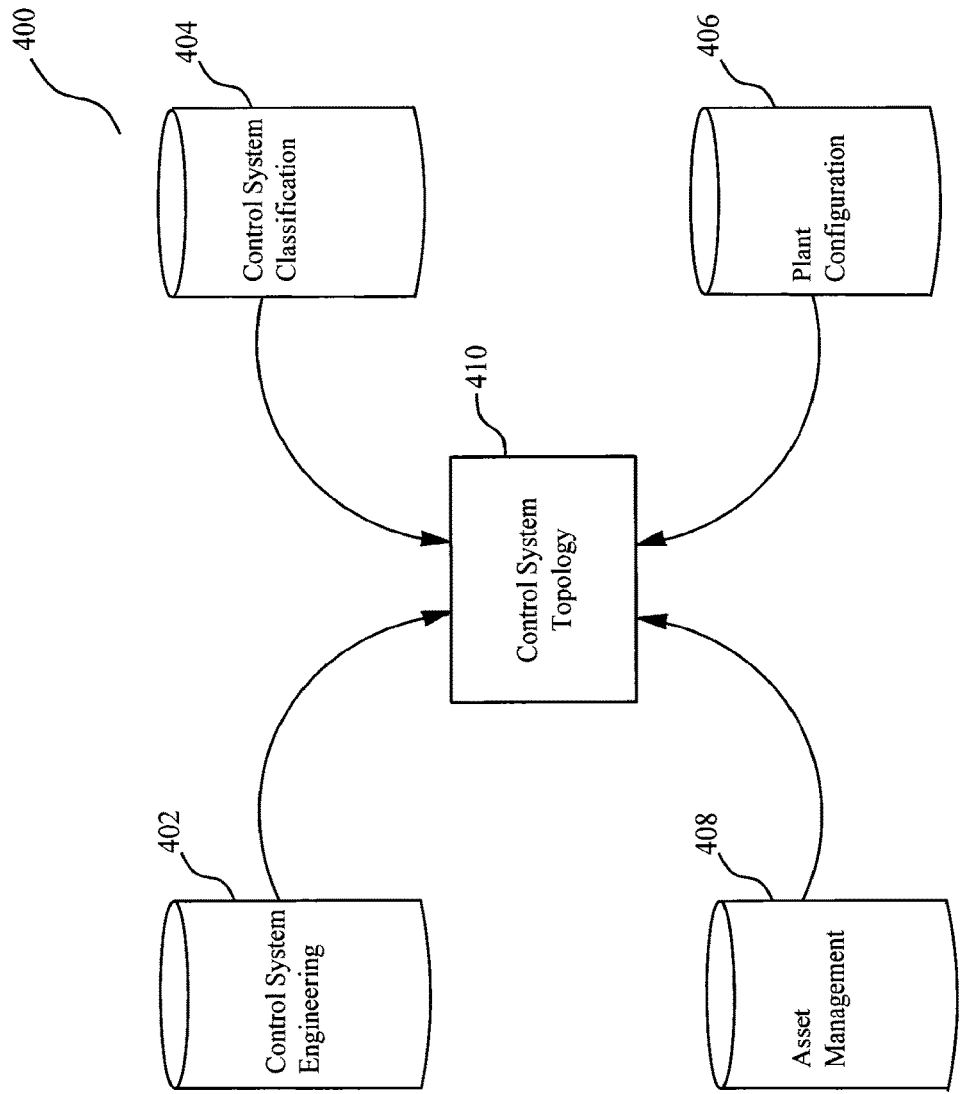

FIG. 4 illustrates heterogeneous data sources that may be used to generate a control system topology.

FIGS. 5A, 6, 7 and 8 illustrate method steps for generating a control system topology based on system engineering information, control system classification information, asset management information and plant configuration information respectively.

Figure 5A:
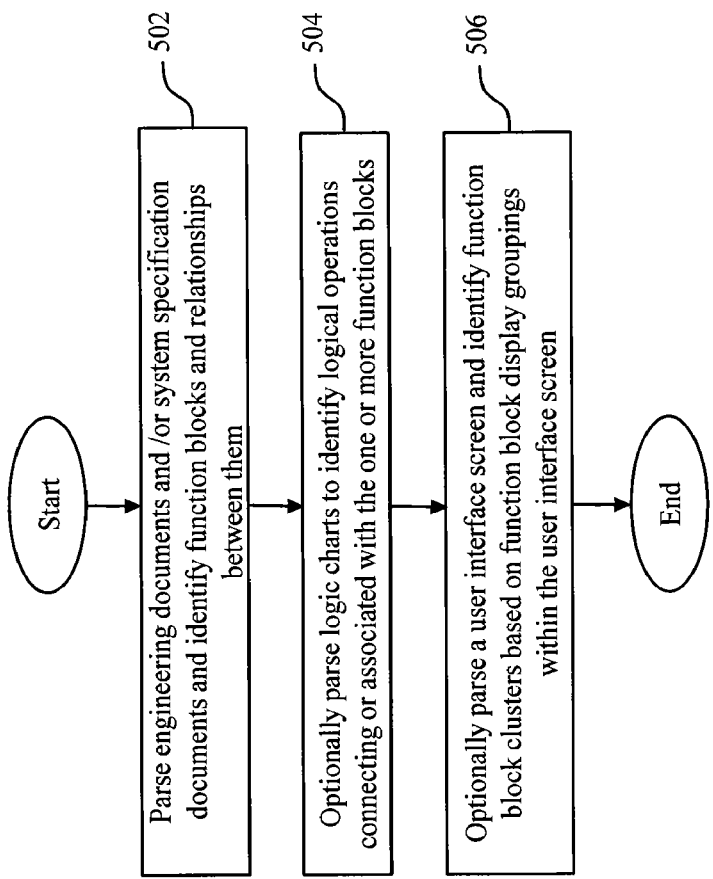

FIGS. 5B to 5E show various outputs of method steps corresponding to the method of FIG. 5A.

Figure 9:
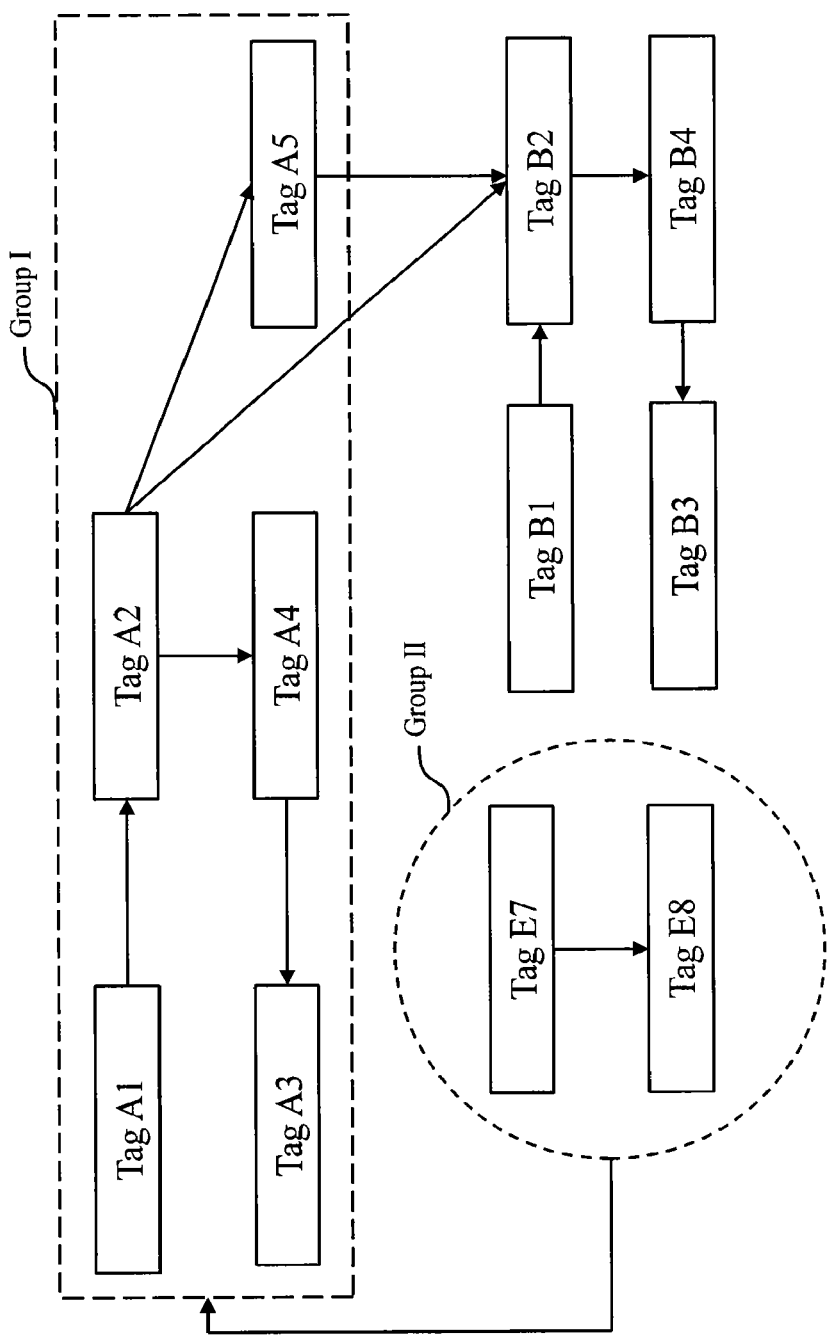

FIG. 9 illustrates an exemplary topology generated based on method steps of the present invention.

Figure 10:
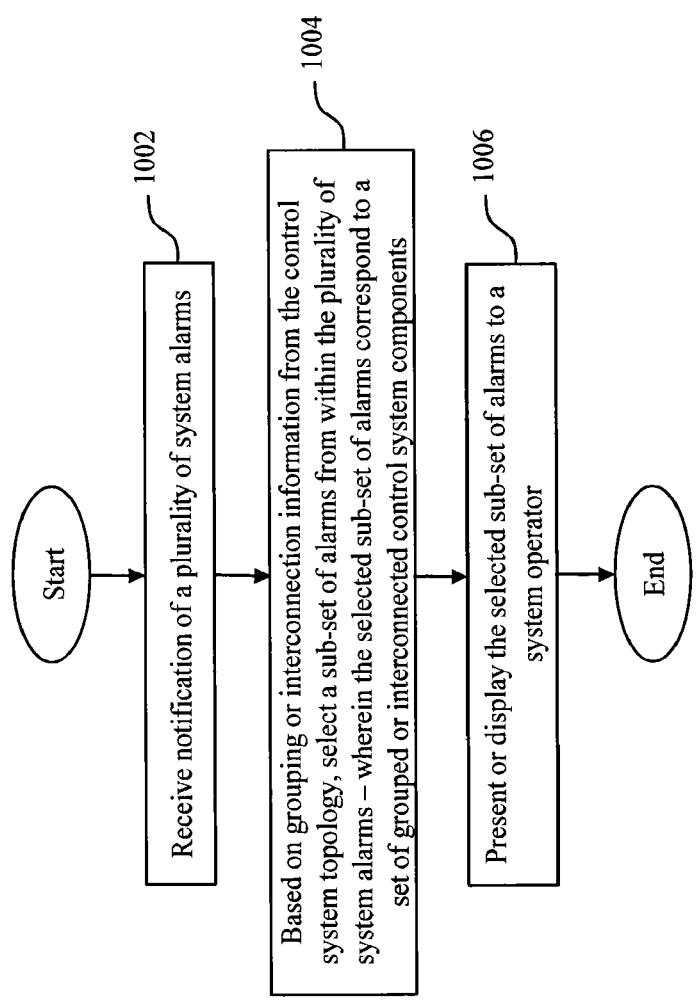

FIG. 10 illustrates a method of real-time system monitoring that relies on a control system topology developed in accordance with the present invention.

Figure 11:
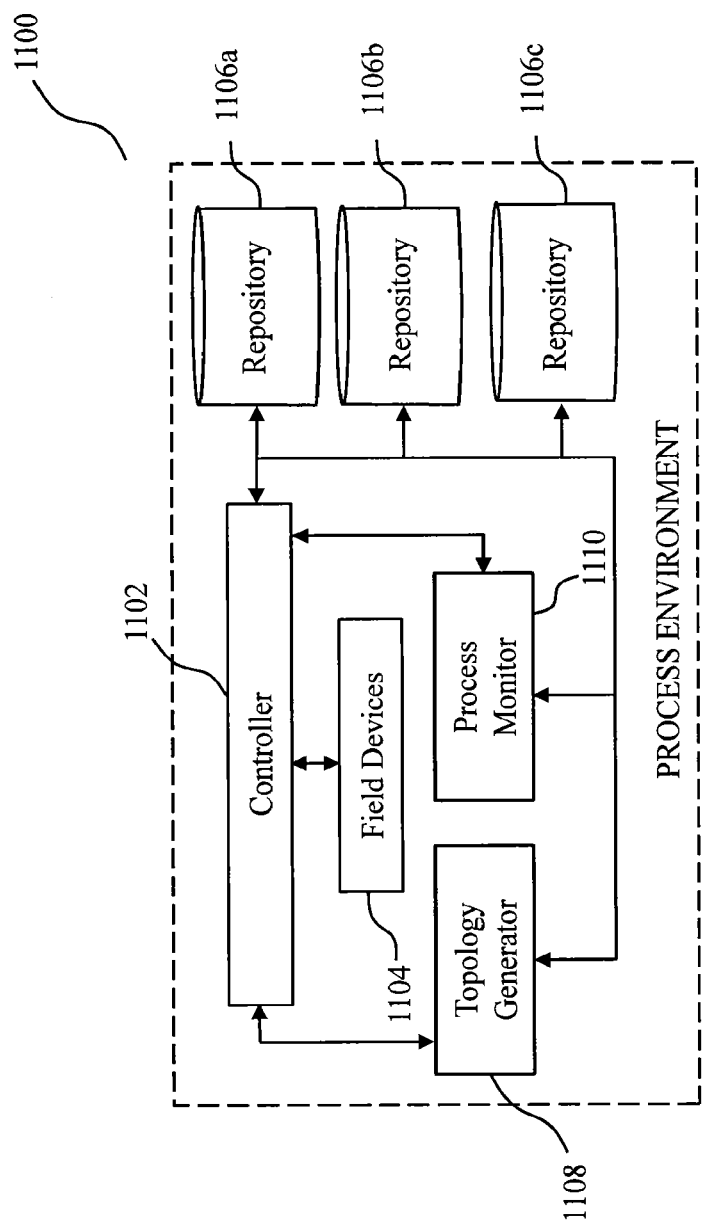

FIG. 11 shows a process environment configured in accordance with the present invention.

Figure 12:
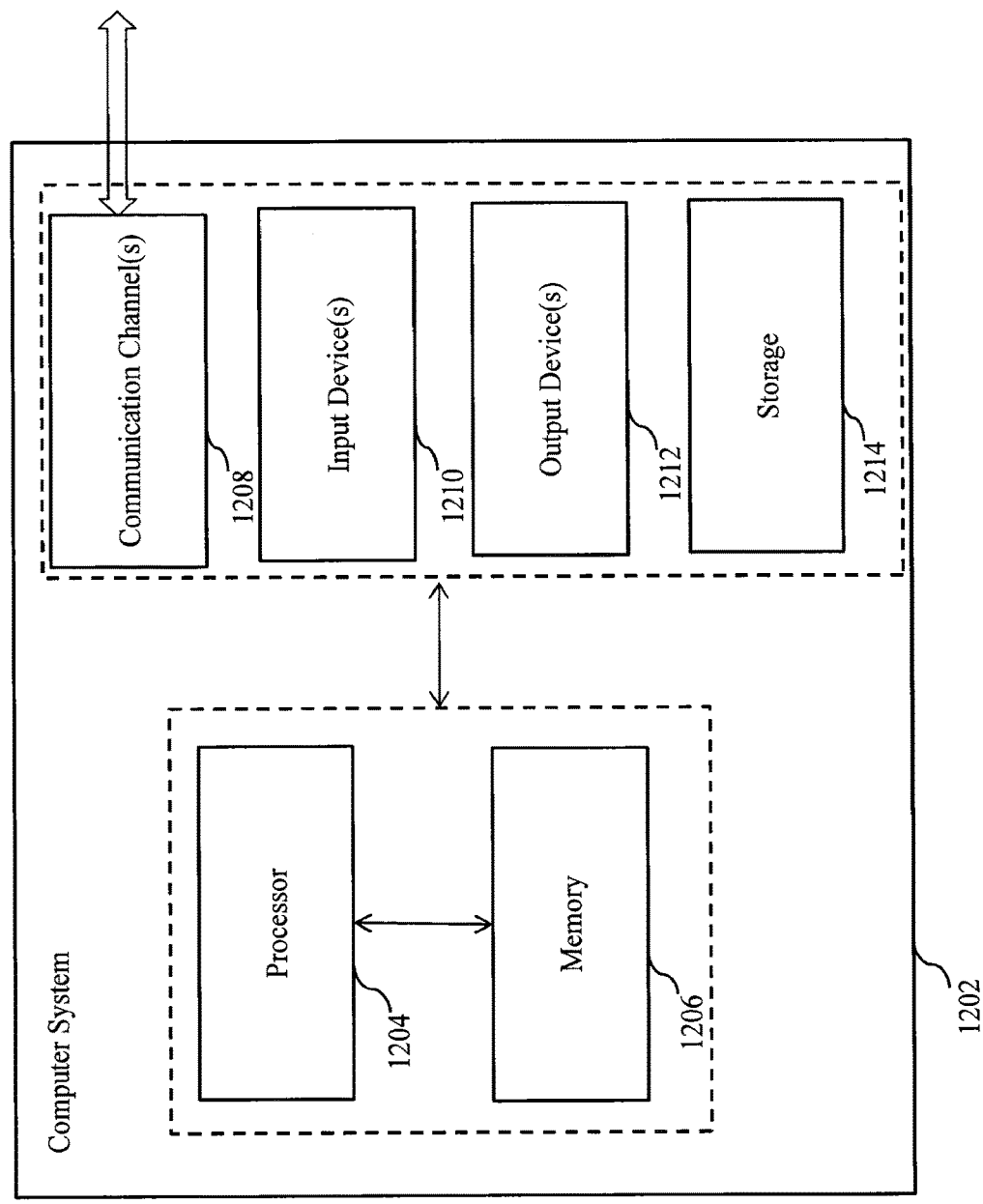

FIG. 12 illustrates an exemplary computing system in which various embodiments of the invention may be implemented.

DETAILED DESCRIPTION

The present invention enables methods, systems and computer program products for control system optimization. The invention achieves the desired optimization through generation of a comprehensive topology for a control system (such as a process control system). The comprehensive topology is generated by identifying function blocks within the control system as well as relationships between such function blocks—based on heterogeneous control system data corresponding to the control system or process environment.

For the purposes of this invention, the term "control system component(s)" shall mean any one or more devices or hardware components (such as controllers, actuators, sensors or other field devices) within a control system.

For the purposes of this invention, the term "control drawing" shall mean any drawing that represents interconnection or flow of control instructions within the control system and/or a process environment controlled thereby. A control drawing may include a plurality of function blocks interconnected in a manner that enables communication of a control action to a control system component and execution of the control action by the control system component. Another type of control drawing may include a plurality of control system components from within the control system or the process environment (such as for example valves, thermocouples, pressure gauges, switches etc.) and may additionally delineate point connections between the plurality of control system components.

For the purposes of the invention, the term "function block" shall mean a discrete or self contained block comprising code that defines and implements an input function (an input function block), an output function (an output function block), or a control function (a control function block) associated with a field device or any other part of a control system. A function block may include any discrete data point (analog or digital) that the control system may need to display or control—and represents, on the basis of corresponding algorithms which are executed in a processor or microprocessor, functions that are intended to be implemented or executed using one or more device or hardware components (such as controllers, actuators, sensors or other field devices) within a control system. Input or output function blocks may produce at least one process control input (such as a process variable from a process measurement device) or process control output (such as a valve position sent to an actuation device) while each control function block uses an algorithm to produce one or more outputs (such as for example, a process control output or an output at a user interface) from one or more inputs (such as for example, a process control input or an input received at a user interface). A function block may be capable of generating alarm or event indications based on predetermined criteria and may be capable of operating differently in different modes. Additionally, a function block may be configured to communicate with other blocks implemented within the same or different field devices—and combinations of function blocks (implemented in the same or different devices) may communicate with each other to produce one or more decentralized control loops.

Exemplary function blocks may include without limitation, components, component inputs, component outputs, set points, system or process variables, controller gains, module status, calculation variables, logical actions, sequential operations, interlocks, control blocks, one or more specific wiring points on a digital or analog input or output card, logic charts, logic blocks, calculation blocks or data inputs to or data outputs from a logic or calculation block.

Function blocks have defined interfaces, and can therefore be interconnected for implementing complex control strategies. While the term "function blocks" is often understood in the context of the Fieldbus protocol, it will be apparent to the skilled person that control systems using other communication protocols will include process function modules analogous to the described function blocks. Thus, the term "function blocks" shall be understood as not being limited to control systems using the Fieldbus protocol, and as having application in networks using other communication protocols as well.

For the purposes of the present invention, "interlock table(s)" shall mean a table that documents process interlocks and/or safety interlocks implemented within a control system. Interlock tables are created by a process engineer by way of manual input during design or commissioning of a control system.

For the purposes of the present invention, "logical chart(s) shall mean a chart or table that documents logical operations that may be performed in response to input signals to achieve a desired sequential control within a control system. Logical charts include logical operators which define logical operations to be performed on input received through input signals, a corresponding output signal to be generated in response to specific input, and a destination function block corresponding to the output signal.

For the purposes of the present invention, "sequence table" shall mean a chart or table that documents condition based actions that are performed sequentially. Sequence tables specify a sequence of actions for execution in response to occurrence of a conditional event.

For the purpose of the present invention, the term "tag" shall be understood as a unique identifier that is associated with or that can be used to access a particular function block. In control system such as DCS or SCADA, a tag simply comprises a unique name, variable or a memory address which may be used to access or control a component or function block to which the tag has been assigned. Tags associated with physical components within a control system may be referred to as "physical tag(s)" while tags associated with data variables, calculations, or logical or sequential operations (and which do not identify a physical component) may be referred to as "virtual tag(s)".

FIG. 1A illustrates a generic process control system 100a. The process control system includes a plurality of controllers 102 and a plurality of field devices, such as for example actuators 104 and sensors 108. Controllers 102 control processes 106 through field devices within the process control system. By way of example, sensors 108 may communicate feedback to controllers 102 regarding state of one or more processes 106. Based on received feedback, controllers 102 may generate control signals and communicate them to actuators 104 to control processes under execution.

Figure 1B:
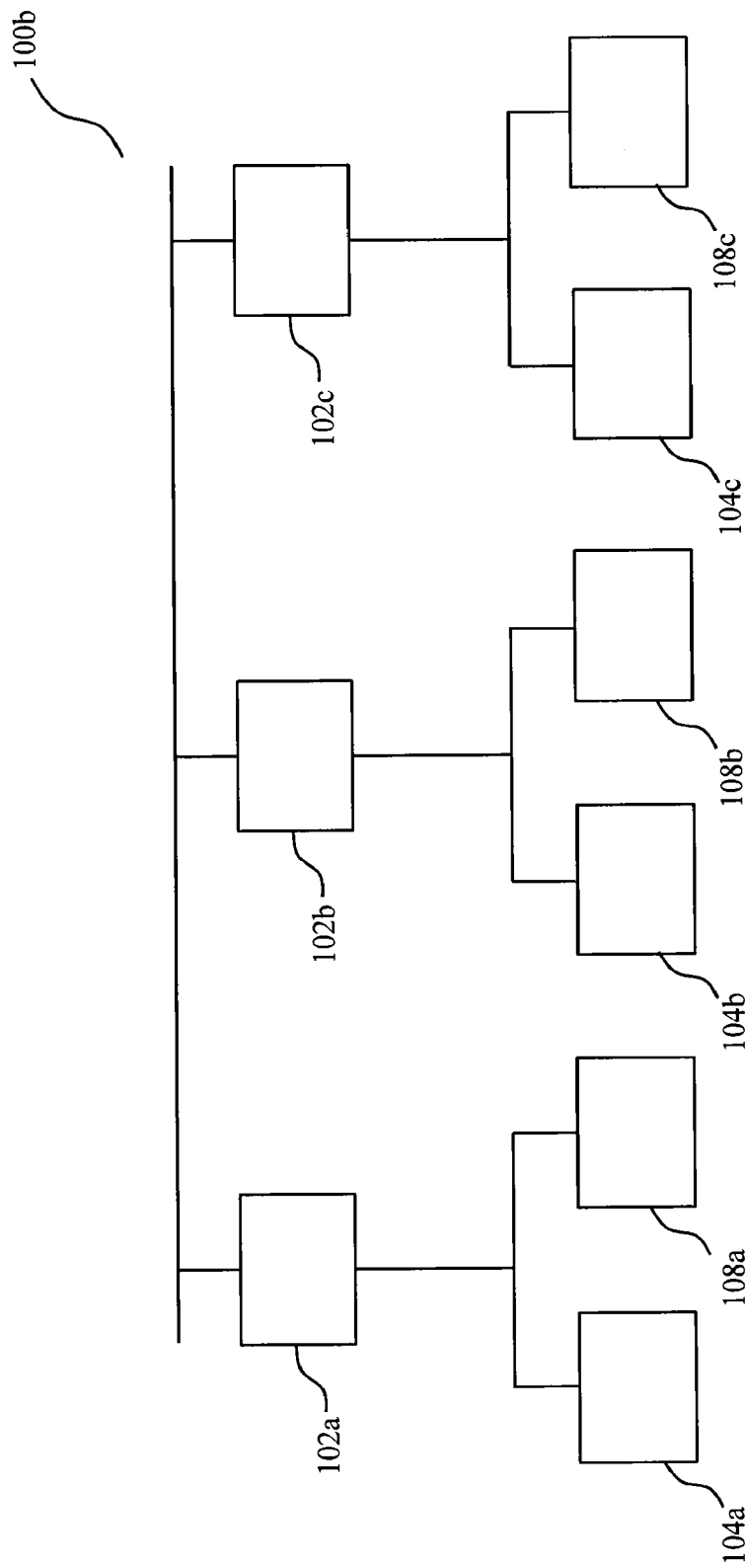
FIGS. 1B and 1C illustrate exemplary control system topologies.
Figure 1C:
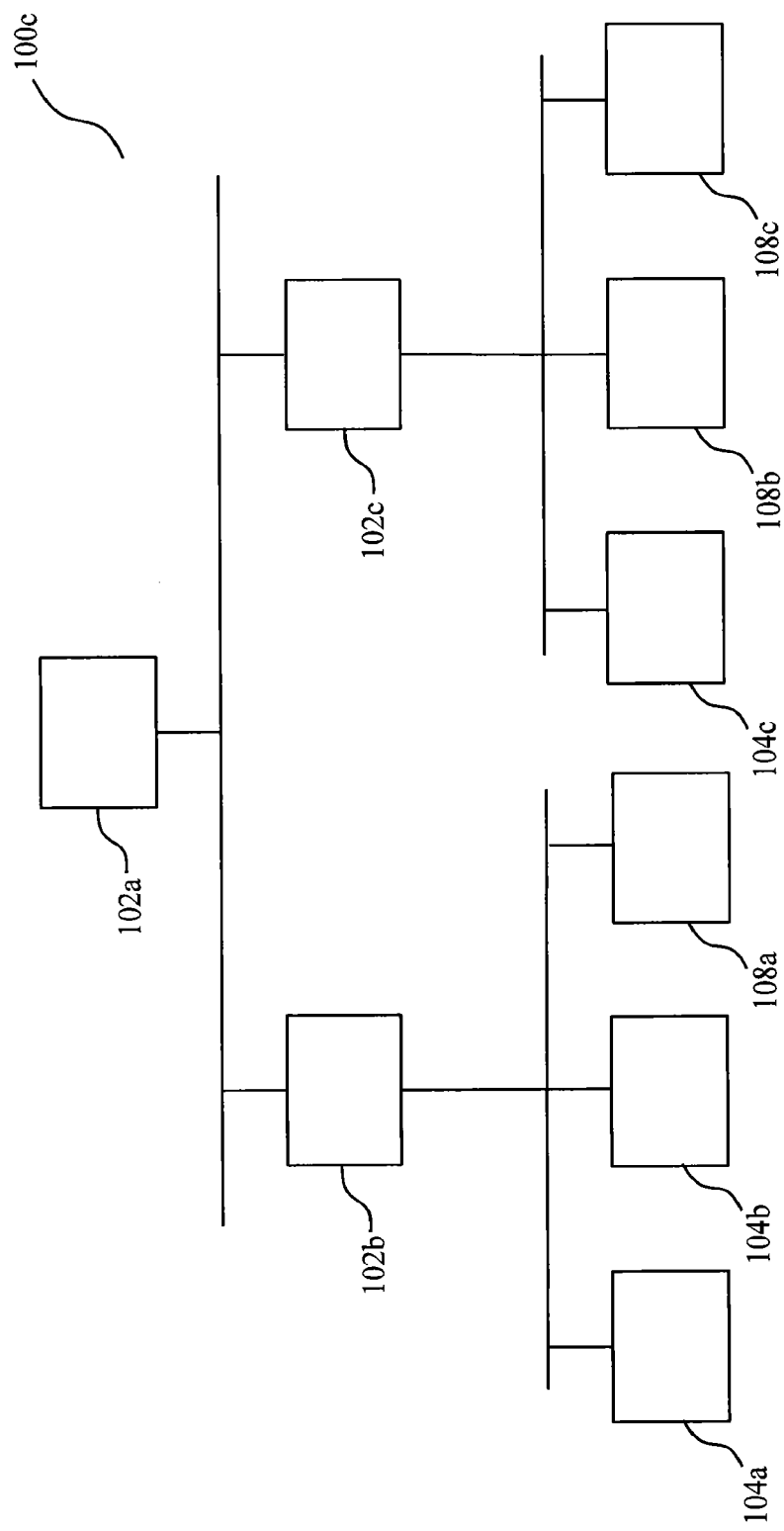

Exemplary FIGS. 1B and 1C illustrate two alternative topologies 100b and 100c for a control system. While both topologies comprise identical control system components (i.e. controllers 102a, 102b and 102c, actuators 104a, 104b and 104c, and sensors 108a, 108b and 108c)—their respective structures are different. FIG. 1B illustrates a decentralized control system, where each of controllers 102a, 102b and 102c are responsible for controlling discrete groups of actuators and sensors. FIG. 1C on the other hand illustrates a centralized control system, wherein controllers 102b and 102c are configured to control discrete groups of actuators and sensors, but are in turn controlled by a centralized controller 102a. While these illustrations are exemplary, they establish that in implementation, the control system 100a of FIG. 1A may be configured in any topology that is suitable for controlling a specific process environment.

A topology of a control system may be represented as a set of interrelated function blocks within the control system. Nodes of the topology correspond to represented function blocks within the control system, while interconnections or and relationships between such nodes may be determined based on data flows, control flows or other attributes representative of function or hierarchy within the control system.

FIG. 2 illustrates a method for generating a control system topology.

Step 202 comprises obtaining information corresponding to the control system. Information corresponding to a control system may be obtained from system designers or system operators, or may be extracted from engineering documents or specifications corresponding to the control system. The engineering documents or specifications may be parsed to extract information describing the control system.

Step 204 comprises identifying function blocks within the control system based on information extracted at step 202. Step 206 thereafter identifies interconnections or relationships between the identified function blocks within the control system, which identification is based on information extracted at step 202. Exemplary relationships between elements of a control system may include data, control or media flow dependencies, sequential relationships or interlock relationships between elements.

Based on function blocks and interconnections or relationships identified at steps 204 and 206, a topology of the control system is generated at step 208. The generated topology may be represented graphically, for example by way of tree structure 300A illustrated in FIG. 3A, where function blocks X1 to X8 of a control system are represented as nodes, and relationships between the function blocks are represented by the connecting arrows as edges. Storage and retrieval of topology information, relies on a data structure or database schema configured to logically store information corresponding to function blocks and relationship information of the control system. FIG. 3B illustrates an exemplary data structure for storing the topology of FIG. 3A—and which data structure has been used to store information corresponding to function blocks X1 to X8 from FIG. 3A. The illustrations of FIGS. 3A and 3B are exemplary, and it will be understood that any graphical representation and any appropriate data structures may be selected for display and storage/retrieval of topologies corresponding to a control system.

FIG. 4 illustrates exemplary heterogeneous data sources that may be used to generate or refine a control system topology in accordance with embodiments of the present invention. As shown, control system topology 410 corresponding to a control system may include information retrieved from discrete and heterogeneous data sources comprising (i) a control system engineering information data source 402 (also known as engineering information repository) (ii) a control system classification information data source 404 (iii) a plant configuration information data source 406 and (iv) an asset management information data source 408. While FIG. 4 shows each data source as a distinct data repository (databases 402 to 408), some or all of these data sources may be stored together within a single database or data repository. The relevance of each of the heterogeneous data sources, and the manner in which information from these data sources may be used to generate a control system topology is described below.

Control system engineering information (as obtained from data source 402) comprises data and information created during the design phase of a control system, and may include (without limitation), engineering documents, or system specification resources such as control drawings, graphic displays windows or graphic display wireframes, logic charts, sequence tables and interlock tables. These documents or specification resources include information regarding function blocks and interconnections corresponding to a control system, which information can be parsed and used to generate a control system topology.

Control system classification information (as obtained from data source 404) comprises classification information corresponding to one or more entities within a control system under observation. Control system classification is based on a classification taxonomy and rules for classifying components within the system. The objective of a classification taxonomy is to correlate or assign unique classification identifiers to control system components and/or function blocks, which unique classification identifiers are generated and assigned in a manner that provides meaningful and accurate attribute information corresponding to the control system component and/or function block. Classification taxonomies are well known within engineering disciplines, including planning, licensing, construction, operation and maintenance. Implementation of classification taxonomies within a control system or a process environment can convey attribute information corresponding to control system components or function blocks, including equipment type or function, media required by the control system component or function block for operation, types of measurements input to or output from a control system component or function block (e.g. temperature, pressure etc.) and identity of a plant or section of a plant within which the control system component or function block has been implemented. In connection with FIG. 4, it would be understood that control system classification information retrieved from data source 404 may include classification identifiers corresponding to control system components or function blocks, as well as classification taxonomy rules for assigning or interpreting classification identifiers.

A classification taxonomy may be hierarchically structured or non-hierarchically structured. A hierarchically structured classification taxonomy provides classification identifiers corresponding to control system components or function blocks that provide information regarding upstream or downstream relationships between said control system components or function blocks. For example, in a hierarchically structured classification taxonomy, successively numbered classification identifiers may indicate that the control system components or function blocks corresponding to two successively numbered identifiers are arranged successively in an upstream or downstream relationship. Likewise, control system components or function blocks having the same identifier with a different alphabet prefix or suffix could indicate that the control system components or function blocks are arranged and operating in parallel. In a non-hierarchically structured classification taxonomy, identifiers corresponding to control system components or function blocks do not provide information regarding upstream or downstream relationships between components. In an embodiment of the present invention, the control system classification information retrieved from data source 404 may comprise classification information corresponding to control system components or function blocks, wherein the classification is based on a hierarchically structured classification taxonomy, such as by way of example the Kraftwerk Kennzeichen System (KKS) or the Plant Numbering System (PNS).

Plant configuration information (as obtained from data source 406) comprises high level flow diagram information connecting major parts of a plant or process control environment in a series of parent-child relationships. Plant configuration information may be generated manually by a system designer at the time of plant design, or may be subsequently generated or refined by system engineers or operators based on run-time observations. Plant configuration information may be stored in plant configuration data source 406 in the form of flow diagrams or tables. Alternatively, information may be parsed from the flow diagrams and stored in an appropriately configured data structure or database that accurately reflects and facilitates retrieval of the parsed flow information.

Asset management information (as obtained from data source 408) comprises information regarding control system components within a control system, including network information (for example, location, proximity or connectivity of a field control station within a plant communication network), equipment type or location related attributes of control system components—which information may be used to group or hierarchically order control system components or function blocks corresponding to such control system components. In an embodiment of the invention, asset management information may additionally include attribute information that describe user requirements or functional results associated with a control system component.

While FIG. 4 illustrates a control system topology generated based on information from each of data sources 402 to 408, the topology may in various embodiments be generated based on information from any one or more of said data sources.

FIG. 5A illustrates method steps associated with generating a control system topology based on information retrieved from control system engineering data source 402 of FIG. 4. Step 502 comprises parsing engineering documents and/or specifications to identify discrete function blocks within the control system and to identify relationships or interconnections between the function blocks. Engineering data parsed at step 502 may include basic system specification documents such as control drawings, logic charts, sequence tables and interlock tables, which map components and functions of a system as well as the process flows between them.

The identified function blocks and interconnections may be used to generate a control system topology. In generating a control system topology, identified function blocks may be represented as nodes, while interconnections may be represented as edges between nodes. In generating the topology, node attributes assigned to each node may be based on identified characteristics of the corresponding function block.

In an embodiment of the invention, a tag associated with each function block may comprise a specific node attribute. In a specific embodiment of the present invention, a control system topology generated based on function block and interconnection information extracted at step 502 of FIG. 5A, may comprise a plurality of interconnected tags, where each tag represents a corresponding function block.

Step 504 comprises an optional step of parsing logic charts, sequence tables or interlock tables, and identifying one or more logical operations that serve to link or interconnect function blocks identified at step 502. The control system topology generated at step 502 may thereafter be modified or refined by adding these additional links or interconnections that have been identified at step 504 to the data structure or database representing the topology.

Step 506 comprises a further optional step of parsing user interface screens, graphic display windows or display wireframes (or data files defining or describing the user interface screens, graphic display windows or display wireframes) and identifying control system components, functional blocks or associated tags that are displayed within a single interface screen, display window or display wireframe. The control system components, functional blocks or tags so identified at step 506 may be grouped or clustered together, and the control system topology generated at either of steps 502 or 504 may thereafter be modified or refined by adding the grouping information identified at step 506 to the data structure or database representing the topology. By grouping control system components or function blocks or tags that are presented or controlled through a single interface screen, the invention generates clusters of control system components or function blocks or tags wherein control system components, function blocks or tags within a cluster are (i) likely to be related to other members of the same cluster and (ii) likely to be influenced by operating conditions, performance or failure of other members of the same cluster. Step 506 may either comprise (i) grouping or clustering of all control system components, function blocks or tags that are displayed within a single interface screen, display window or display wireframe or (ii) may selectively group or cluster a two or more components or function blocks that are displayed within a single interface screen, display window or display wireframe—wherein the selection of components or function blocks from within the single interface screen, display window or display wireframe may be based on a predefined set of rules or criteria for selection.

In an embodiment of the invention, one or more of method steps 502 to 506 are applied to generate a topology for an industrial process control system (such as for example a DCS or SCADA based control system).

Figure 5B:
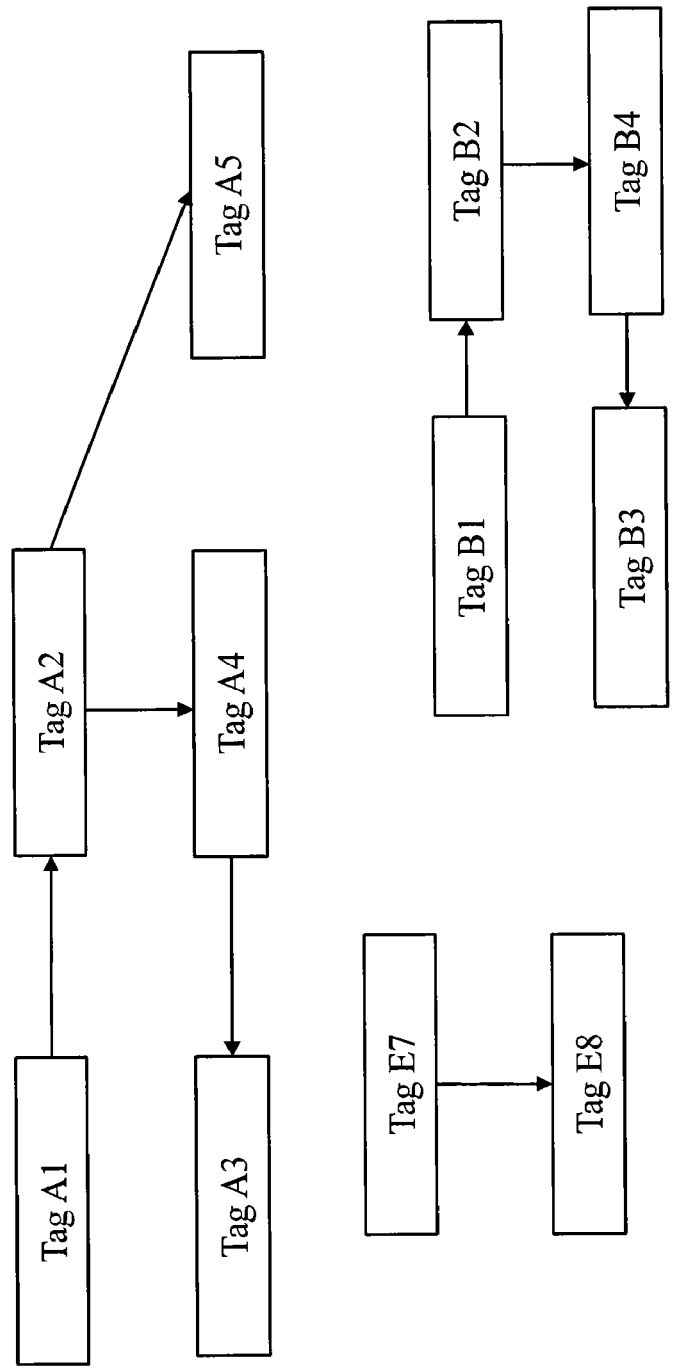
Figure 5C:
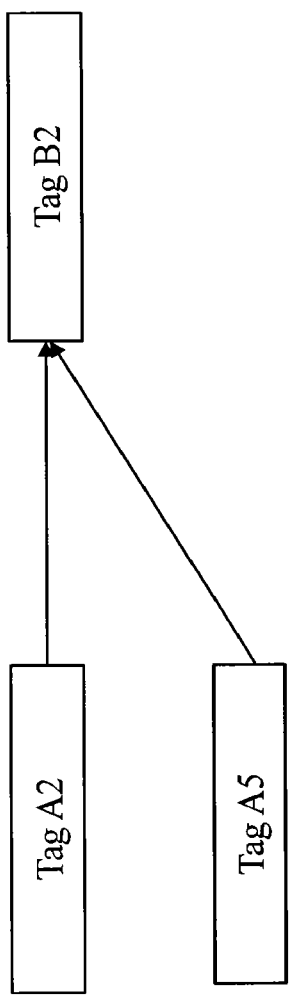
Figure 5D:
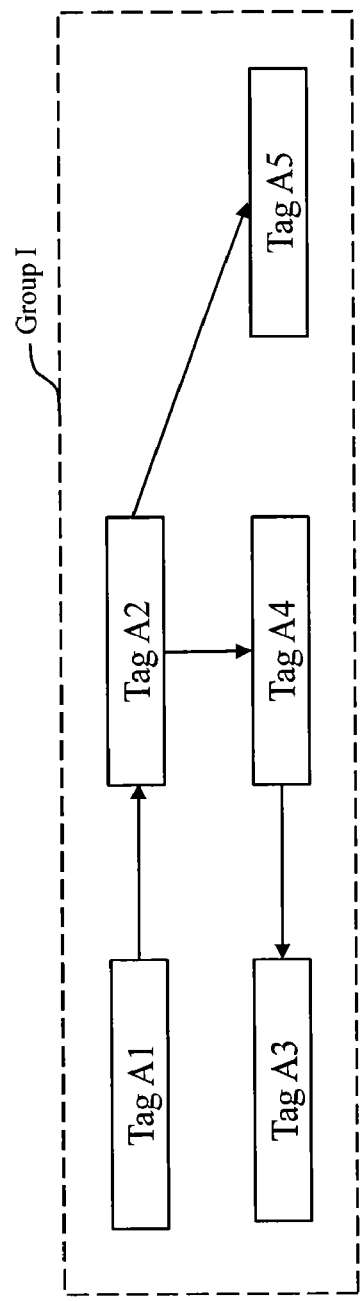
Figure 5E:
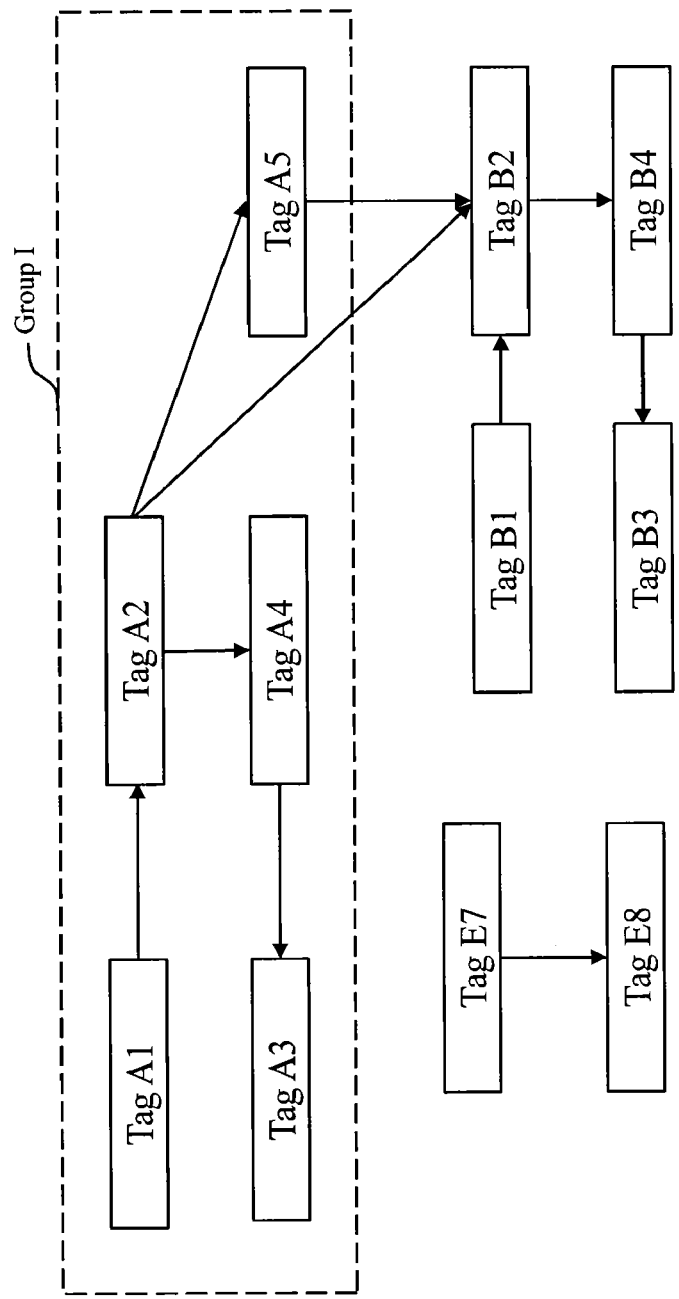

FIGS. 5B to 5E illustrate exemplary outputs of steps 502 to 506 of FIG. 5A. Specifically, FIG. 5B illustrates an exemplary first set of tags or function blocks (A1 to A5, B1 to B4, E7 and E8) and interconnections identified by parsing engineering documents and/or system specifications at step 502 of FIG. 5A. FIG. 5C illustrates an exemplary set of further interconnections between some of the previously identified tags or function blocks (A2, B2 and A5), which further interconnections are identified at step 504 of FIG. 5A by parsing logic charts, sequence tables or interlock tables. FIG. 5D illustrates an exemplary output from step 506 of FIG. 5, wherein tags A1 to A5 are grouped together (into exemplary Group I), for reason of being displayed together within a user interface screen. FIG. 5E illustrates an exemplary topology, comprising the tags and interconnections of FIG. 5B, with the additional interconnections of FIG. 5C and the grouping of tags A1 to A5 from FIG. 5D.

Figure 6:
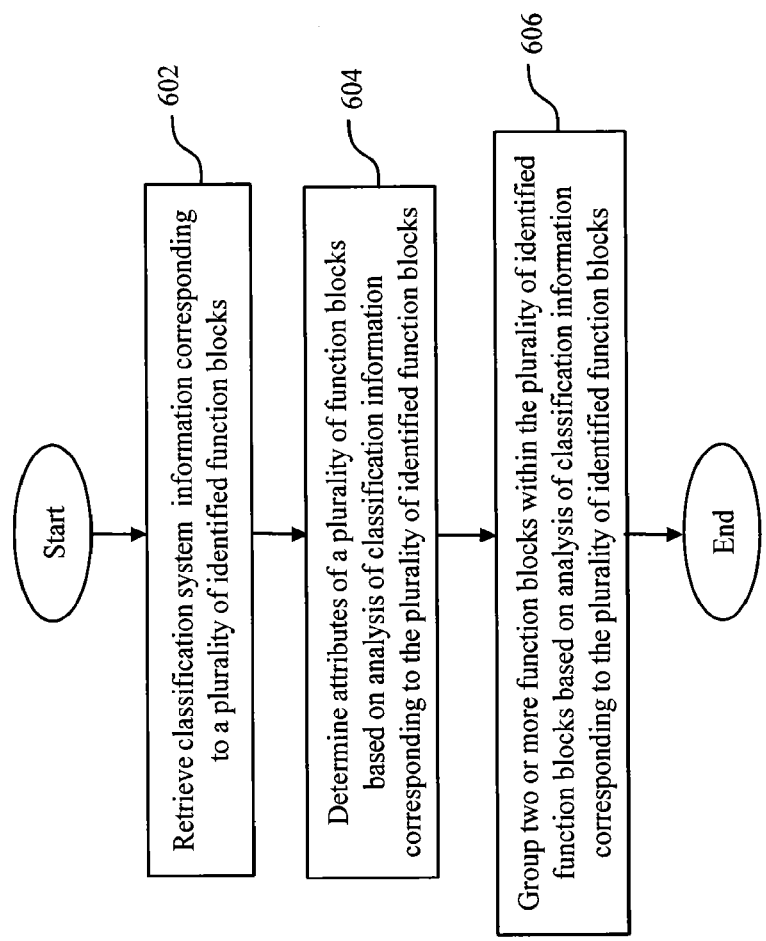

FIG. 6 illustrates method steps associated with generating a control system topology or refining or modifying an existing control system topology based on information retrieved from control system classification data source 404 of FIG. 4.

Step 602 comprises obtaining control system classification information corresponding to a plurality of function blocks or tags that have been identified in any of the steps of FIG. 5A, or that correspond to a previously generated control system topology. Control system classification information may be retrieved from a control system classification data source (such as data source 404 in FIG. 4). As discussed in connection with FIG. 4, the obtained control system classification information may comprise classification identifiers corresponding to identified function blocks or tags, and may optionally include information necessary for understanding or implementing the underlying classification taxonomy.

Thereafter, step 604 comprises determining attributes of the plurality of identified function blocks or tags based on an analysis of classification identifiers assigned to each of the plurality of identified function blocks. Analysis of classification identifiers may be carried out based on classification rules associated with the underlying classification taxonomy—which classification rules may be used to identify attributes of function blocks or tags based on the classification identifier that has been assigned to a function block or tag.

Step 606 comprises grouping two or more function blocks or tags from among the plurality of identified function blocks, which grouping is based on analysis of classification information corresponding to the plurality of identified function blocks or tags. Grouping of function blocks or tags may be based on a predefined set of rules or criteria.

In an exemplary embodiment of the invention, a predefined criteria for grouping of function blocks or tags may require grouping of two or more function blocks or tags based on attributes common to the two or more function blocks or tags, which common attributes are identified in the course of the classification information based analysis of the plurality of function blocks or tags at step 606. In a non-limiting embodiment of the method, function blocks or tags may be grouped together at step 606 based on at least one or more of:

location within the same part of an industrial plant
reliance on the same physical media (e.g. electricity, steam etc.) for operation
common equipment type
sharing an upstream or downstream relationship, for example, in terms of one or more of data, media or control flow One or more of the groupings determined at step 606 may be used to generate or refine a control system topology, by adding grouping information to a data structure or database representing the topology.

Figure 7:
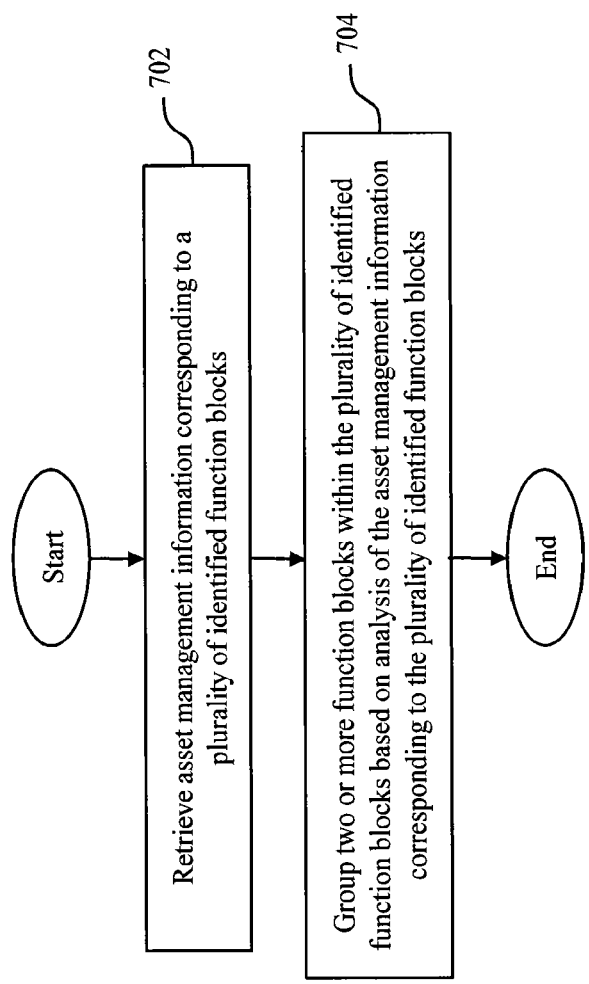

FIG. 7 illustrates method steps associated with generating a control system topology or with refining or modifying an existing control system topology based on asset management information retrieved from asset management data source 408 of FIG. 4.

Step 702 comprises obtaining asset management information corresponding to a plurality of function blocks or tags that have been identified in any of the steps of FIG. 5A or that correspond to a previously generated control system topology. Asset management information may be retrieved from an asset management information data source (such as data source 408 in FIG. 4).

Thereafter, step 704 comprises grouping two or more function blocks or tags within the plurality of identified function blocks or tags, based on analysis of the asset management information corresponding to the plurality of identified function blocks. Grouping of two or more function blocks or tags based on analysis of the asset management information may be based on a predefined set of rules or criteria for grouping. In an embodiment of the invention, grouping of two or more function blocks or tags is based on asset management attributes common to the two or more function blocks or tags, which common attributes are identified in the course of the analysis at step 704. In an embodiment, function blocks or tags may be grouped together at step 704 based on one or more of:

being associated with the same equipment type
being located within the same area or plant site
being in network communication with each other The groupings determined at step 704 may be used to generate or refine a control system topology, by adding grouping information to a data structure or database representing the topology.

Figure 8:
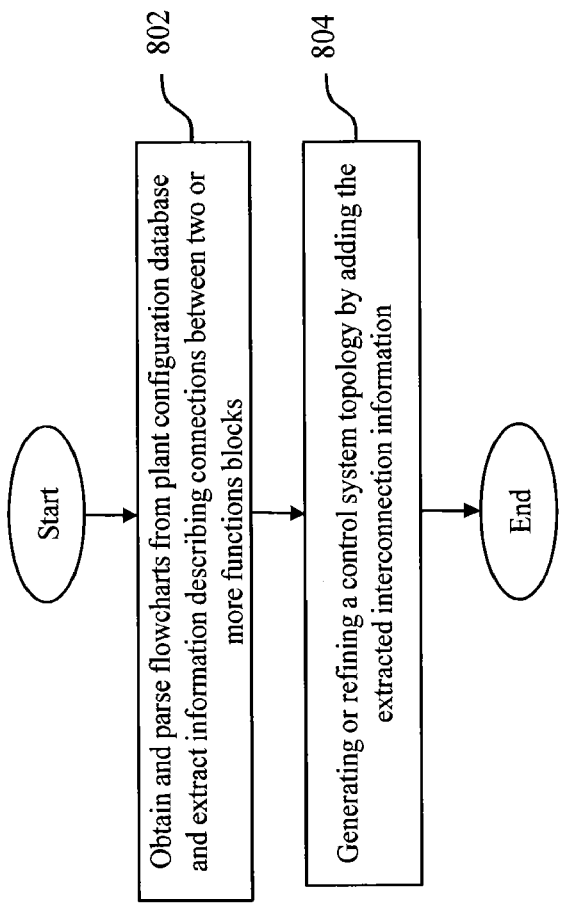

FIG. 8 illustrates method steps associated with generating a control system topology or with refining or modifying an existing control system topology, based on plant configuration information retrieved from plant configuration data source 406 of FIG. 4.

Step 802 comprises obtaining and parsing flowcharts from a plant configuration information data source (such as data source 406 of FIG. 4). As explained previously, plant configuration information comprises system designer or system operator generated flow diagram information connecting parts of a plant or process control environment in a series of parent-child relationships. Plant configuration information may include relationships and interconnections not recorded in the control system engineering information or other data sources, or relationships and interconnections that were not recorded at the time of system implementation and which have arisen subsequently or that have been subsequently observed in the course of system operators' subsequent run-time observations and experience. Accordingly, the parsing step at 802 results in additional information describing connections between function blocks, events or entities within the control system or within the process control environment.

Step 804 comprises generating or refining a control system topology, by adding additional interconnection information obtained at step 802, to a data structure or database representing the control system topology.

It would be understood that generating a control system topology in accordance with the present invention may involve a combination of any of the method steps described in connection with FIG. 5A, along with one or more of the methods steps subsequently discussed in connection with FIGS. 6, 7 and 8.

FIG. 9 illustrates an exemplary topology arrived at by combining the topology previously obtained and discussed in connection with FIG. 5E (i.e. a control system topology resulting from the method steps of FIG. 5A) with information describing further grouping and interconnections of function blocks or tags arising from one or more of the methods of FIG. 6, 7 or 8.

The consolidated and comprehensive control system topologies resulting from the methods described above offer multiple advantages. A first advantage is that these topologies present improved information regarding relationships and interconnections between function blocks within a process environment. This improved information can be used for the purposes of root cause analysis—for example to correlate events (such as changes in process environment conditions) with subsequent system changes (such as alarms). This improves system monitoring and reduces event response time by enabling real time correlation between causative events and alarm notifications or system interruptions, allowing personnel to identify and address causative factors quickly and accurately. The improved system topology information also enables predictive modelling of process and component behaviour—which in turn improves predictive maintenance and reduces system downtime. The improved topology information also has relevance for personnel training purposes, for improving knowledge transfer from existing operators, and for advancing system design in response to previously undeciphered relationship or interconnection information.

FIG. 10 illustrates an exemplary method of real-time system monitoring that relies on and implements a control system topology developed in accordance with the methods described above.

Step 1002 comprises receiving a plurality of event notifications or alarm notifications related to the control system. At step 1004, a sub-set of event notifications or alarm notifications are selected from among the received plurality of event notifications or alarm notifications, wherein selection of the sub-set of event notifications or alarm notifications is based on functional block grouping or interconnection information extracted from the control system topology corresponding to the control system—such that the selected sub-set of event notifications or alarm notifications corresponds to a grouped or interconnected set of function blocks within the control system topology. It would be understood that selection of a sub-set of event notifications or alarm notifications based on extracted grouping or interconnection information may rely on one or more predefined or operator defined rules for selection.

Step 1006 comprises presenting or displaying the selected sub-set of event notifications or alarm notifications to a system operator. In an embodiment of the invention, the control system eliminates or does not display or present event notifications or alarm notifications other than the selected sub-set of alarm notifications to the system operator. In another embodiment, the selected sub-set of event notifications or alarm notifications are presented to a user in real time or with an indication that they require high priority, while all other event notifications or alarm notifications received from the control system are either not displayed, or displayed in a time phased manner or with a delay, or displayed with an indication of lower priority. The selection, prioritization or exclusion of event notifications or alarm notifications at step 1006 may be based on predefined or operator defined rules for selection, prioritization or exclusion of event notifications or alarm notifications.

In an embodiment that enables predictive modelling, subsequent to step 1006, the control system may optionally notify a system operator regarding control system components or function blocks that are operating normally but which are interconnected or grouped with control system components or function blocks for which event notifications or alarm notifications have been received—thereby enabling the system operator to monitor these control system components or function blocks for any potential failure or alarm notifications, or for initiation of preventive maintenance.

In an implementation related embodiment of the real time system monitoring method described above, the method responds to detection of a first event within the process environment by identifying a first control system component or first function block within the process control system, which identified first control system component or first function block is related to the detected event. The method thereafter identifies a second control system component or second function block within the process control system, which identified second control system component or second function block is related to the identified first control system component or first function block. Identification of the second component may be based on at least one of information identifying interconnections between a plurality of function blocks or information identifying grouping of a plurality of function blocks, that is retrieved from the control system topology. One or more event notifications may thereafter be displayed at a user interface, which displayed one or more event notifications include information corresponding to both the first control system component or first function block, and the second control system component or second function block.

In a more specific embodiment, the detected event within the process environment may be independent of or only indirectly related to the identified second control system component or second function block. However, based on (i) the detected first event being related to the first control system component or first function block and (ii) interconnection information or grouping information that establishes a determined interconnection or grouping involving the first and second control system components or first and second function blocks—the method associates the detected first event with both of the first and second control system components or function blocks and displays one or more event notifications with information corresponding to both of the first and second control system components or function blocks. In a specific instance of the above embodiment, the displayed one or more event notifications with information corresponding to both of the first and second control system components or function blocks includes (i) at least a first event notification corresponding to the detected first event that is related to the first control system component or first function block, and (ii) optionally includes at least a second event notification corresponding to a detected second event that is related to the second control system component or second function block. The detected first event may in certain embodiments be indirectly related to, independent of or unrelated to the second control system component or second function block. Likewise, the detected second event may in certain embodiments be indirectly related to, independent of or unrelated to the first control system component or first function block.

In an embodiment, the method assigns a first priority to the detected first event and assigns a second priority to a detected second event—wherein, responsive to determining that the second event is either independent of or only indirectly related to the first and second control system components or function blocks, the assigned second priority is lower than the assigned first priority.

It would be understood that by controlling presentation of alarm or event notifications based on topology information regarding grouped or interconnected events or entities, the invention significantly improves (i) root cause analysis (ii) the likelihood of associative or connected problems being prevented, detected and resolved and (iii) response time or timelines for remedial action. As a result of the invention, in addition to real time notification of a detected event, a system operator can now receive in real time, contextually relevant information regarding associated or causative upstream events, as well as associated downstream events that may have been caused or are likely to be caused by the detected event. The additional contextual information improves accuracy of root cause analysis, and also reduces response time involved in isolating a root cause and identifying and delivering a remedial or preventive maintenance solution. Likewise, reducing the urgency or priority assigned to unconnected or isolated event notifications or alarm notifications, the invention (i) reduces the likelihood of incorrect associations between isolated or unconnected event notifications or alarm notifications, and (ii) enables a system operator to realistically ascertain the magnitude and effect of a detected problem or failure, and to prioritize simultaneously occurring events, alarms or failures in order of importance.

FIG. 11 illustrates an exemplary process environment 1100 configured to implement the methods of the present invention. Controller 1102 is connected to a plurality of repositories 1106a to 1106c, which repositories may contain one or more heterogeneous data sources (of the kind that have been described in connection with FIG. 4) that may be used to generate and/or refine a control system topology in accordance with embodiments of the present invention. Controller 1102 is also communicably coupled to one or more field devices 1104 (which field devices may include sensors and actuators for effecting control of process environment 1000). Both controller 1102 and repositories 1106a to 1106c are communicably coupled to topology generator 1108—which in an embodiment of the invention, is configured to generate a control system topology in accordance with one or more of the methods discussed above in connection with of FIGS. 5A, 6, 7 and 8. The process environment 1100 additionally includes process monitor 1110 that is communicably coupled to controller 1102 and topology generator 1108 for monitoring the process environment, and generating, displaying and prioritising notifications or alarms in accordance with one or more of the method steps discussed above in connection with FIG. 10.

FIG. 12 illustrates an exemplary computing system in which various embodiments of the invention may be implemented.

The system 1202 comprises at least one processor 1204 and at least one memory 1206. The processor 1204 executes program instructions and may be a real processor. The processor 1204 may also be a virtual processor. The computer system 1202 is not intended to suggest any limitation as to scope of use or functionality of described embodiments. For example, the computer system 1202 may include, but not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a system 1202 in accordance with the present invention may include one or more servers, desktops, laptops, tablets, smart phones, mobile phones, mobile communication devices, tablets, phablets and personal digital assistants. In an embodiment of the present invention, the memory 1206 may store software for implementing various embodiments of the present invention. The computer system 1202 may have additional components. For example, the computer system 1202 includes one or more communication channels 1208, one or more input devices 1210, one or more output devices 1212, and storage 1214. An interconnection mechanism (not shown) such as a bus, controller, or network, interconnects the components of the computer system 1202. In various embodiments of the present invention, operating system software (not shown) provides an operating environment for various softwares executing in the computer system 1202 using processor 1204, and manages different functionalities of the components of computer system 1202.

The communication channel(s) 1208 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 1210 may include, but is not limited to, a touch screen, a keyboard, mouse, pen, joystick, trackball, a voice device, a scanning device, or any another device that is capable of providing input to the computer system 1202. In an embodiment of the present invention, the input device(s) 1210 may be a sound card or similar device that accepts audio input in analog or digital form. The output device(s) 1212 may include, but not limited to, a user interface on CRT, LCD, LED display, or any other display associated with any of servers, desktops, laptops, tablets, smart phones, mobile phones, mobile communication devices, phablets, personal digital assistants, printer, speaker, CD/DVD writer, or any other device that provides output from the computer system 1202.

The storage 1214 may include, but is not limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1202. In various embodiments of the present invention, the storage 1214 contains program instructions for implementing the described embodiments.

In an embodiment of the present invention, the computer system 1202 is part of a distributed network.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1202. The method described herein is typically implemented as a computer program product, comprising a set of program instructions which is executed by the computer system 1202 or any other similar device. The set of program instructions may be a series of computer readable codes stored on a tangible medium, such as a computer readable storage medium, for example, diskette, CD-ROM, ROM, flash drives or hard disk, or transmittable to the computer system 1202, via a modem or other interface device, over either a tangible medium, including but not limited to optical or analogue communications channel(s) 1208. The implementation of the invention as a computer program product may be in an intangible form using wireless techniques, including but not limited to microwave, infrared, bluetooth or other transmission techniques. These instructions can be pre-loaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method for control system optimization, the method comprising:
retrieving from an engineering information repository, control system engineering information corresponding to an implemented control system that controls a plurality of hardware components;
based on the retrieved control system engineering information, identifying a plurality of function blocks and function block interconnections corresponding to the implemented control system, wherein:
identified function blocks comprise code defining at least one of an input function, an output function or a control function associated with a hardware component within the implemented control system, and
each function block interconnection defines a relationship between identified function blocks;
identifying at least one group of function blocks from within the identified plurality of function blocks corresponding to the implemented control system, wherein:
identification of the group of function blocks is based on identification of one or more attributes shared by each function block within the identified group of function blocks, and
the identified group of function blocks includes some but not all function blocks within the identified plurality of function blocks corresponding to the implemented control system;
generating a control system topology based on the identified function blocks, identified function block interconnections, and identified group of function blocks, wherein generating the control system topology comprises including within a data structure corresponding to the implemented control system:
information defining the identified plurality of function blocks,
information defining the identified function block interconnections, and
grouping information corresponding to the identified group of function blocks, wherein:
the grouping information enables identification of members of the identified group of function blocks from among the identified plurality of function blocks, and the grouping information is distinct from the information defining the identified plurality of function blocks and the information defining the identified function block interconnections;
responding to detection of a first event within a process environment associated with the implemented control system by:
identifying a first function block within the implemented control system, wherein the identified first function block is related to the detected first event,
identifying a second function block within the implemented control system, wherein the identified second function block is related to the identified first function block, and
displaying an event notification at a user interface, wherein the displayed event notification includes information corresponding to both the first function block and the second function block, wherein identification of the second function block is based on at least one of function block interconnection information or function block group information retrieved from the control system topology; and
controlling a hardware component within the implemented control system.

2. The method as claimed in claim 1, wherein the control system engineering information comprises information retrieved from one or more of engineering documents, system specifications, control drawings, logic charts, sequence tables or interlock tables.

3. The method as claimed in claim 1, wherein identification of one or more attributes shared by each function block within the identified group of function blocks is based on classification identifiers assigned to each of the plurality of function blocks.

4. The method as claimed in claim 3, wherein the classification identifiers conform to a hierarchically structured classification taxonomy.

5. The method as claimed in claim 3, wherein the one or more attributes shared by each function block within the identified group of function blocks comprises any of:
physical location;
physical media relied on for operation;
equipment type; or
an upstream or downstream data flow, media flow or control flow relationship.

6. The method as claimed in claim 1, wherein the one or more attributes shared by each function block within the identified group of function blocks comprises any of:
equipment type;
location within a specific area or plant site; or
being in network communication with other function blocks within the identified group of function blocks.

7. The method as claimed in claim 1, wherein the one or more attributes shared by each function block within the identified group of function blocks comprises inclusion of each said function block within a single interface screen, display window or display wireframe corresponding to a user interface within the implemented control system.

8. The method as claimed in claim 1, wherein generating the control system topology is additionally based on function block interconnections derived from component interconnections within the implemented control system, and wherein the component interconnections are extracted from plant configuration information corresponding to the implemented control system.

9. The method as claimed in claim 1, wherein the detected first event is independent of the identified second function block.

10. The method as claimed in claim 1, wherein displaying event notifications at the user interface includes displaying an event notification corresponding to a detected second event, wherein the detected second event relates to the identified second function block.

11. A system for control system optimization, the system comprising:
one or more controllers;
a plurality of field devices; and
a processor configured to:
retrieve from an engineering information repository, control system engineering information corresponding to an implemented control system that controls a plurality of hardware components, based on the retrieved control system engineering information, identify a plurality of function blocks and function block interconnections corresponding to the implemented control system, wherein:
identified function blocks comprise code defining at least one of an input function, an output function or a control function associated with a hardware component within the implemented control system, and each function block interconnection defines a relationship between identified function blocks,
identify at least one group of function blocks from within the identified plurality of function blocks corresponding to the implemented control system, wherein:
identification of the group of function blocks is based on identification of one or more attributes shared by each function block within the identified group of function blocks, and the identified group of function blocks includes some but not all function blocks within the identified plurality of function blocks corresponding to the implemented control system,
generate a control system topology based on the identified function blocks, identified function block interconnections, and identified group of function blocks, wherein generating the control system topology comprises including within a data structure corresponding to the implemented control system:
information defining the identified plurality of function blocks,
information defining the identified function block interconnections, and
grouping information corresponding to the identified group of function blocks, wherein:
the grouping information enables identification of members of the identified group of function blocks from among the identified plurality of function blocks, and the grouping information is distinct from the information defining the identified plurality of function blocks and the information defining the identified function block interconnections, and
a process monitor configured such that,
responsive to detection of a first event within a process environment associated with the implemented control system:
identify a first function block within the implemented control system, wherein the identified first function block is related to the detected event,
identify a second function block within the implemented control system, wherein the identified second function block is related to the identified first function block, and
display an event notification at a user interface, wherein the displayed event notification includes information corresponding to both the first function block and the second function block, wherein identification of the second function block is based on at least one of function block interconnection information or function block group information retrieved from the control system topology,
wherein the processor is further configured to control a hardware component within the implemented control system.

12. The system as claimed in claim 11, wherein the control system engineering information comprises information retrieved from one or more of engineering documents, system specifications, control drawings, logic charts, sequence tables or interlock tables.

13. The system as claimed in claim 11, wherein the processor is configured to identify one or more attributes shared by each function block within the identified group of function blocks based on classification identifiers assigned to each of the plurality of function blocks.

14. The system as claimed in claim 13, wherein the classification identifiers conform to a hierarchically structured classification taxonomy.

15. The system as claimed in claim 13, wherein the one or more attributes shared by each function block within the identified group of function blocks comprises any of:
physical location;
physical media relied on for operation;
equipment type; or
an upstream or downstream data flow, media flow or control flow relationship.

16. The system as claimed in claim 11, wherein the one or more attributes shared by each function block within the identified group of function blocks comprises any of:
equipment type;
location within a specific area or plant site or
being in network communication with other function blocks within the identified group of function blocks.

17. The system as claimed in claim 11, wherein the one or more attributes shared by each function block within the identified group of function blocks comprises inclusion of each said function block within a single interface screen, display window or display wireframe corresponding to a user interface within the implemented control system.

18. The system as claimed in claim 11, wherein the process monitor is configured such that the detected event is independent of the identified second function block.

19. The system as claimed in claim 11, wherein the process monitor is configured such that displaying event notifications at the user interface includes displaying an event notification corresponding to a detected second event, wherein the detected second event relates to the identified second function block.

20. The system as claimed in claim 11, wherein generating the control system topology is additionally based on function block interconnections derived from component interconnections within the implemented control system, and wherein the component interconnections are extracted from plant configuration information corresponding to the implemented control system.

21. A a non-transitory computer usable medium having a computer readable program code embodied therein, the computer readable program code comprising instructions for causing the computer to perform:
retrieving from an engineering information repository, control system engineering information corresponding to an implemented control system that controls a plurality of hardware components;
based on the retrieved control system engineering information, identifying a plurality of function blocks and function block interconnections corresponding to the implemented control system, wherein:
identified function blocks comprise code defining at least one of an input function, an output function or a control function associated with a hardware component within the implemented control system, and each function block interconnection defines a relationship between identified function blocks;

identifying at least one group of function blocks from within the identified plurality of function blocks corresponding to the implemented control system, wherein:
   identification of the group of function blocks is based on identification of one or more attributes shared by each function block within the identified group of function blocks, and
   the identified group of function blocks includes some but not all function blocks within the identified plurality of function blocks corresponding to the implemented control system;
generating a control system topology based on the identified function blocks, identified function block interconnections, and identified group of function blocks, wherein generating the control system topology comprises including within a data structure corresponding to the implemented control system:
   information defining the identified plurality of function blocks,
   information defining the identified function block interconnections, and
   grouping information corresponding to the identified group of function blocks, wherein:
      the grouping information enables identification of members of the identified group of function blocks from among the identified plurality of function blocks, and
      the grouping information is distinct from the information defining the identified plurality of function blocks and the information defining the identified function block interconnections;
responding to detection of a first event within a process environment associated with the implemented control system by:
   identifying a first function block within the implemented control system, wherein the identified first function block is related to the detected first event,
   identifying a second function block within the implemented control system, wherein the identified second function block is related to the identified first function block,
   displaying an event notification at a user interface, wherein the displayed event notification includes information corresponding to both the first function block and the second function block, wherein identification of the second function block is based on at least one of function block interconnection information or function block group information retrieved from the control system topology; and
controlling a hardware component within the implemented control system.

* * * * *